United States Patent
Sugiyama

[11] Patent Number: 6,006,623
[45] Date of Patent: Dec. 28, 1999

[54] SHIFT LEVER ASSEMBLY

[75] Inventor: Takashi Sugiyama, Wako, Japan

[73] Assignee: Honda Giken Kogyo Kabushiki Kaisha, Tokyo, Japan

[21] Appl. No.: 08/917,078

[22] Filed: Aug. 25, 1997

[30]     Foreign Application Priority Data

Aug. 27, 1996  [JP]  Japan ..................................... 8-244176

[51] Int. Cl.⁶ .............................. B60K 20/00; F16K 1/12
[52] U.S. Cl. .................. 74/473.15; 74/473.3; 74/473.34; 74/501.6
[58] Field of Search ............................ 74/473.15, 473.3, 74/473.32, 473.31, 473.33, 501.6

[56]              References Cited

U.S. PATENT DOCUMENTS

| | | | |
|---|---|---|---|
| 2,917,941 | 12/1959 | Writtren ................................. | 74/473.3 |
| 4,630,500 | 12/1986 | Suzuki ................................. | 74/473.15 |
| 4,649,766 | 3/1987 | Kiekhaefer ........................... | 74/473.15 |
| 4,916,964 | 4/1990 | Crack .................................... | 74/473.15 |
| 5,592,856 | 1/1997 | Parsons ................................. | 74/473.3 |
| 5,706,702 | 1/1998 | Yamada ................................. | 74/473.15 |

*Primary Examiner*—John A. Jeffery
*Assistant Examiner*—Marcus Charles
*Attorney, Agent, or Firm*—Armstrong, Westerman, Hattori, McLeland, and Naughton

[57]              ABSTRACT

A shift lever assembly of a vehicle comprises: a base member; a shift lever supported by the base member so as to be pivotable around a shifting axis and a selection axis, the shifting axis and the selection axis being at a right angle to each other; an extension extending from the shift lever and connected to a first cable for transmitting a movement of the shift lever around the shifting axis to transmission means, wherein the connection between the first cable and the extension of the shift lever lies on the selection axis. In this shift lever assembly, the selection movements of the shift lever do not cause the bending of the cable connected to the extension of the shift lever for transmitting the shifting movements of the shift lever, and do not apply undesired stress upon the cable. Therefore, with a simple mechanism, it is possible to put the connection between the extension of the shift lever and the cable close to the end of the cable casing for receiving and guiding the cable, thus achieving reduced assembly size and smaller space for installing the shift lever assembly.

10 Claims, 4 Drawing Sheets

SHIFT LEVER ASSEMBLY

TECHNICAL FIELD

The present invention relates to a shift lever assembly of a vehicle.

BACKGROUND OF THE INVENTION

A shift lever used in controlling a manual transmission is typically moved in its operation in both longitudinal and transverse directions following a generally H-shaped pattern. In some automatic transmissions, it is desired that the automatic transmissions may be manually shifted by operating a shift lever under proper shift control provided by a guide slot (or a so-called gate-pattern) through which the shift lever extends. Such shift levers are required to be supported so as to be pivotable around two axes at a right angle to each other. The two axes are often referred to as a selection axis and a shifting axis. When a shift lever assembly is installed in a center floor of the vehicle, the selection axis is generally in parallel to the longitudinal (for-and-aft) direction of the vehicle and the shifting axis is generally in parallel to the transverse (lateral) direction of the vehicle.

In some conventional shift lever assemblies, the shifting movements of the shift lever around the shifting axis are transmitted to the transmission as linear movements of a cable connected to the shift lever, with the cable being connected to the shift lever at a point spaced from a pivot point at which the shift lever is pivotably supported. The cable is typically received in a fixed casing or sheath for guiding the linear movements of the cable, and a part of the cable extends out from the casing. In such an arrangement, the selection movements of the shift lever around the selection axis cause the connection between the shift lever and the cable to move transversely, accordingly causing the cable to bend at the end of the cable casing. Generally, repeatedly bending a cable over large angles tends to prematurely degrade the cable. In such conventional shift lever assemblies, in order to achieve a smaller bending angle of the cable, the distance from the connection between the shift lever and the cable to the bending point (or the end of the cable casing) becomes longer. This leads to a larger shift lever assembly which consumes valuable space in the vehicle.

BRIEF SUMMARY OF THE INVENTION

In view of such problems of the prior art, a primary object of the present invention is to provide a shift lever assembly which requires small space for installation.

A second object of the present invention is to provide such a shift lever assembly as a simple mechanism and for a reasonable cost.

To achieve the above objects, the present invention provides a shift lever assembly for a vehicle comprising: a base member; a shift lever supported by the base member so as to be pivotable around a shifting axis and a selection axis, the shifting axis and the selection axis being at a right angle to each other; and an extension extending from the shift lever and connected to a first cable for transmitting a movement of the shift lever around the shifting axis to transmission means, wherein the connection between the first cable and the extension of the shift lever lies on the selection axis.

Preferably, the shift lever is pivotably supported by means of a gimbal joint. More preferably, the shift lever has a free end provided with a knob to be handled by a vehicle operator and a base end pivotably supported by the gimbal joint, and the extension extends from the base end of the shift lever in the direction away from the free end of the shift lever and is curved in a hook-like manner so that the connection between the first cable and the extension lies on the selection axis.

In one preferred embodiment of the present invention, the shift lever assembly comprises a pivot member for supporting the shift lever so that the shift lever is pivotable around the selection axis, and the pivot member is mounted in the base member so as to be pivotable around the shifting axis. Preferably, the pivot member is generally cylindrical in shape and the base member comprises a case adapted for mounting the pivot member so that the pivot member is pivotable around the shifting axis. The shift lever may be supported so as to be pivotable around the selection axis by the pivot member via a pivot pin. Preferably, the pivot member includes a pivot pin aligned with the selection axis, and the shift lever has an annular part fitted on the pivot pin of the pivot member so that the shift lever is pivotable around the selection axis.

The shift lever assembly according to the present invention may further comprise means for transmitting a movement of the shift lever around the selection axis to the transmission means, when used with a manual transmission. Preferably, the means for transmitting a movement of the shift lever around the selection axis comprises: an arm member extending from the annular part of the shift lever substantially laterally through an opening provided in the pivot member; and a lever member having one end pivotably connected to a free end of the arm member, the other end connected to a second cable operatively connected to the transmission means, and a middle portion pivotably connected to the base member. More preferably, the middle portion of the lever member is connected to the base member so as to be pivotable around an axis parallel to the shifting axis.

Thus, in the shift lever assembly according to the present invention, the selection movements of the shift lever do not cause the bending of the cable connected to the extension of the shift lever for transmitting the shifting movements of the shift lever. Therefore, with a simple mechanism, it is possible to put the connection between the extension of the shift lever and the cable close to the end of the cable casing for receiving and guiding the cable, thus achieving reduced assembly size and smaller space for installing the shift lever assembly.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
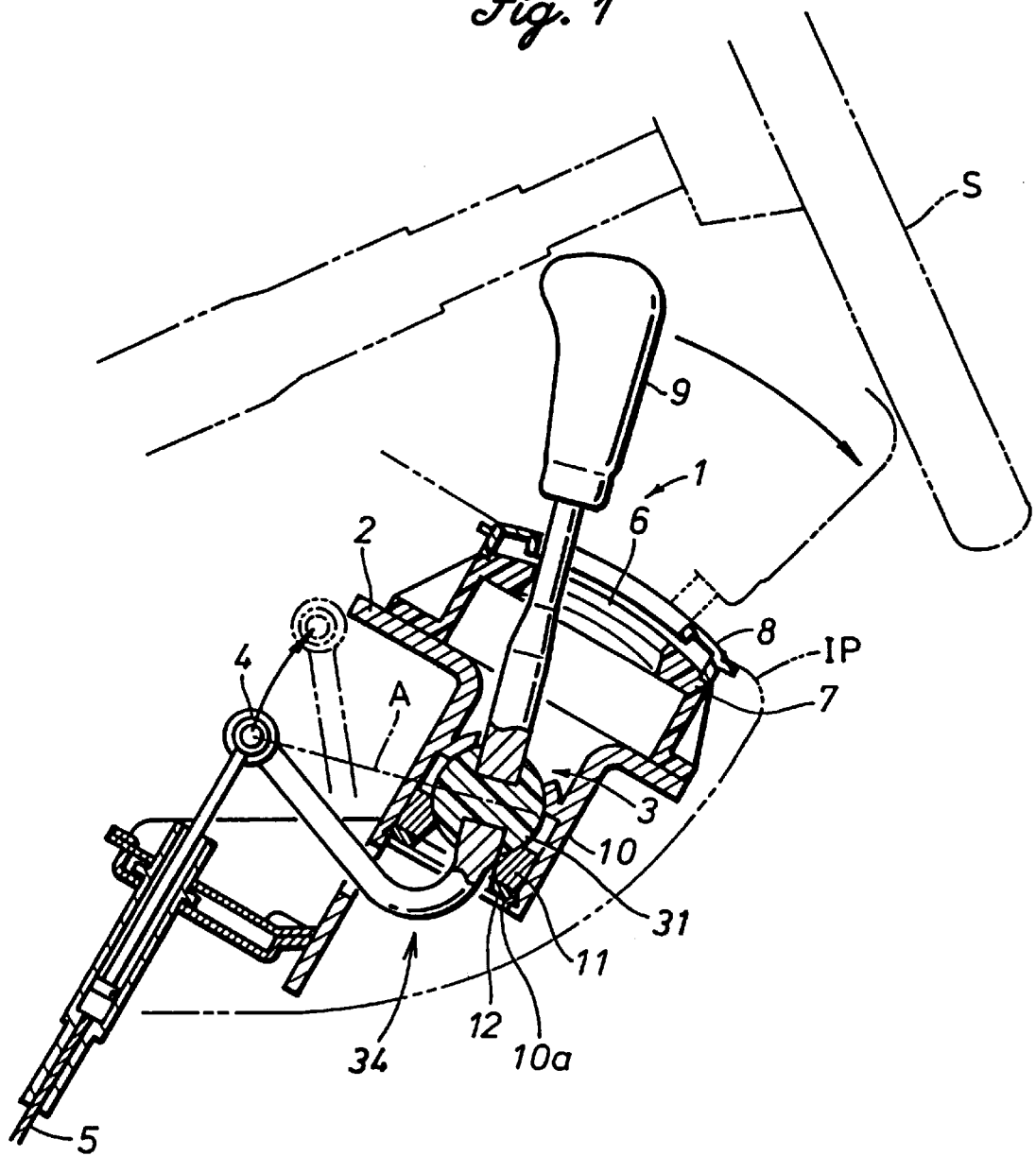
FIG. 1 is a side cross sectional view of a shift lever assembly according to the present invention.

FIG. 1 shows one embodiment of a shift lever assembly according to the present invention. As shown in the drawing, a shift lever 1 is supported by a gimbal joint 3 provided in a base 2 which is securely attached in an instrument panel IP at a position near a steering wheel S. The gimbal joint 3 allows the shift lever 1 to be pivotably moved in both for-and-aft (shifting) direction around a shifting axis and lateral (selecting) direction around a selection axis. The shifting and selection axes are at a right angle to each other. This shift lever assembly is suitable for use with an automatic transmission which may be manually shifted by the shift lever moved so as to follow a gate-pattern (or guide slot) adapted for providing proper control to such manual range selection. Further, when provided with means for transmitting the selection movements of the shift lever 1, as described in more detail later, this shift lever assembly can also be used with a manual transmission having a generally "H"-shaped gear shift pattern.

As shown in FIG. 1, the shift lever 1 extending through the gimbal joint 3 has an extension 34 having an end 4 which is connected to a cable 5, which in turn is connected to a control lever (not shown) of the automatic transmission. The extension 34 is curved in a hook-like manner so that the end 4 lies on the selection axis of the shift lever 1. In this way, the selection movements of the shift lever 1 do not cause the end 4 of the shift lever 1 to move transversely, thereby preventing the bending of the cable 5 connected to the end 4.

Mounted on the base 2 is a guide plate 7 including a guide slot 6 through which the shift lever 1 extends, the guide slot 6 determining the allowable movements of the shift lever 1. The upper surface of the guide plate 7 is preferably covered by an aesthetically colored and textured outer surface 8. Further, a knob 9 to be handled by the driver is attached to the upper end of the shift lever 1.

Figure 3:
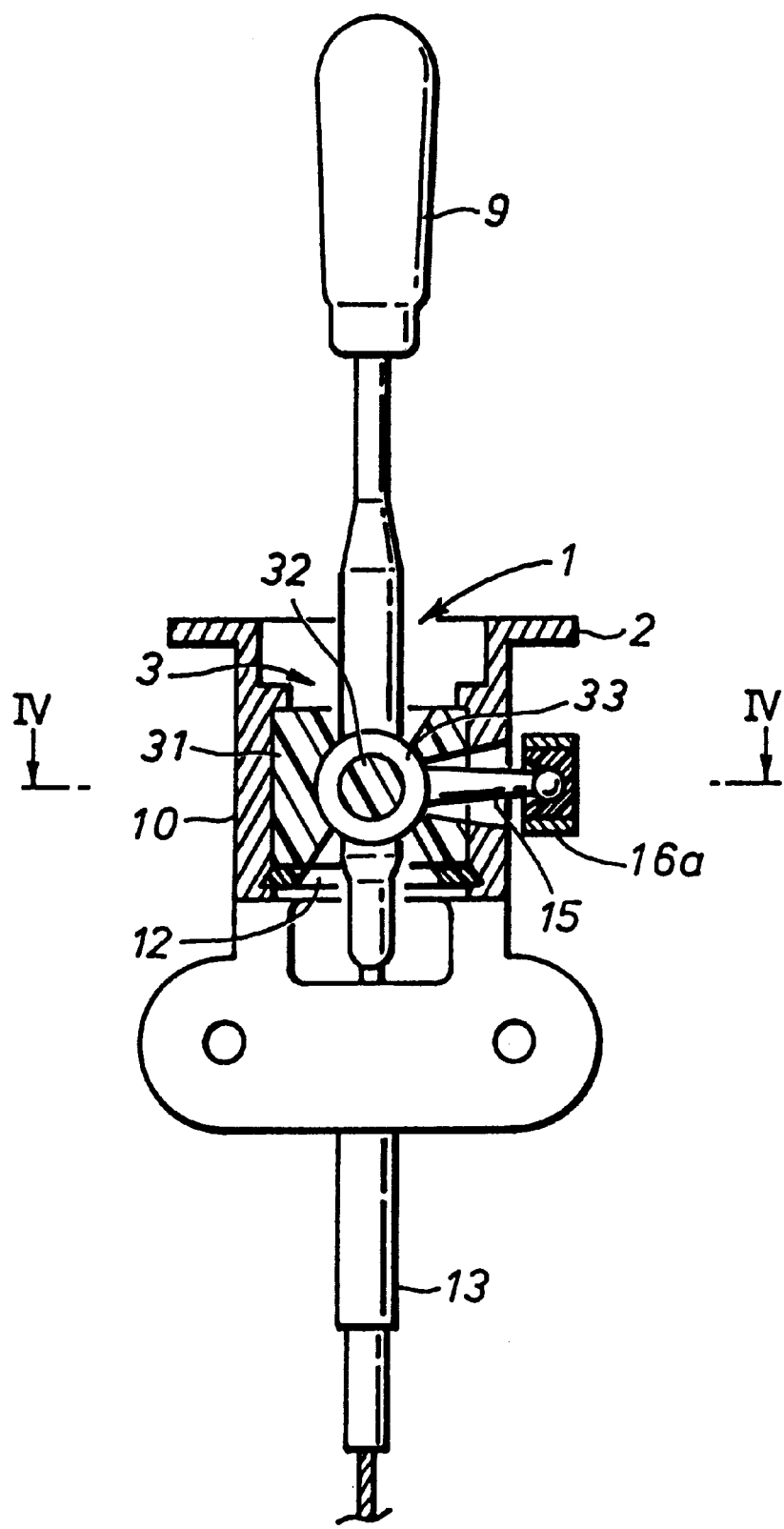
FIG. 3 is a cross sectional view taken along the line III—III in FIG. 2.
Figure 4:
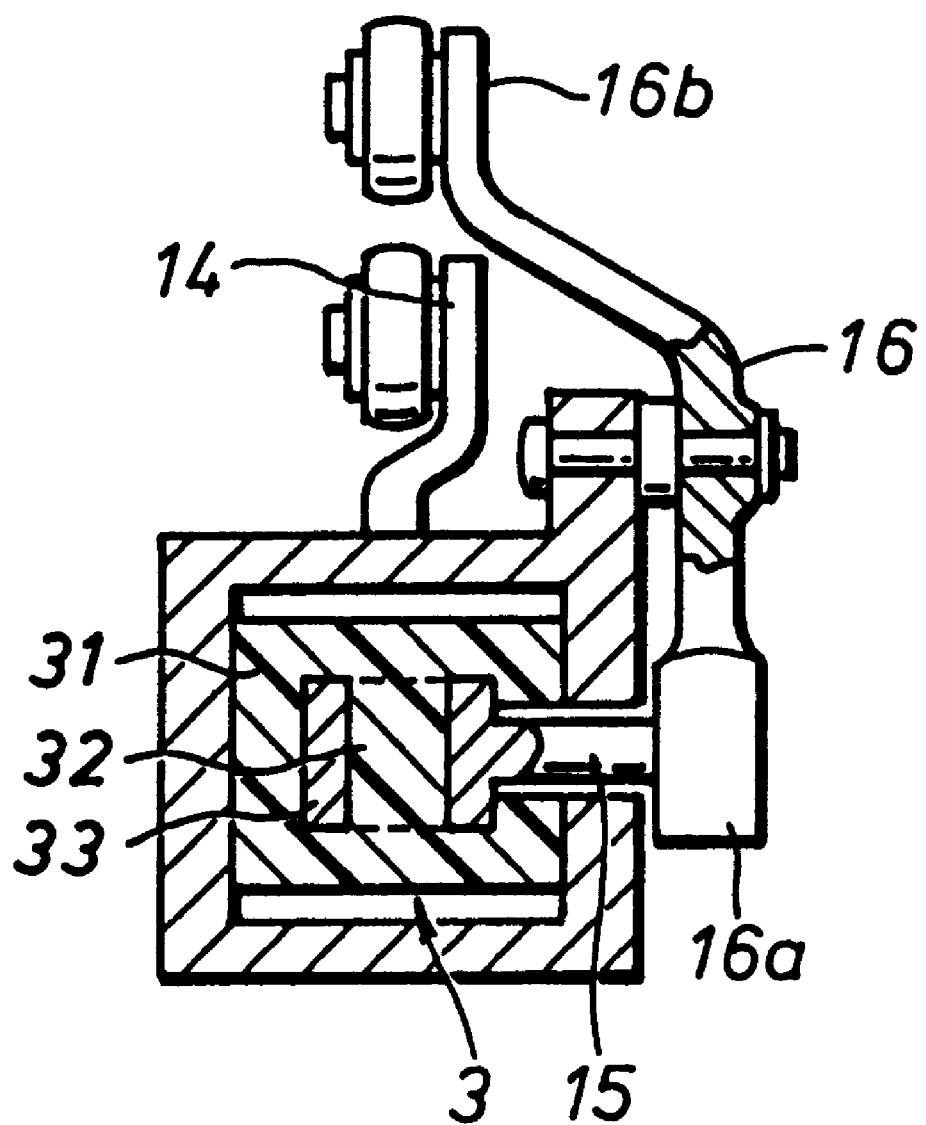
FIG. 4 is a cross sectional view taken along the line IV—IV in FIG. 3.

Also referring to FIGS. 3 and 4, the gimbal joint 3 comprises a generally cylindrically-shaped pivot member 31 which is mounted in a case 10 formed in the base 2 adapted so that the pivot member 31 is pivotable around the shifting axis. The pivot member 31 is provided with a hollow (or through-hole) through which the shift lever 1 extends, and in the hollow the pivot member 31 further includes a pivot pin 32 aligned with the selection axis. On the pivot pin 32 is fitted an annular part 33 formed in the shift lever 1 so that the shift lever 1 can pivot around the pivot pin 32, i.e., around the selection axis. In this way, the shift lever 1 is supported so as to be pivotable around the shifting and selection axes which are at a right angle to each other.

In assembling this shift lever assembly, first the shift lever 1 attached beforehand in the pivot member 31 is inserted upwardly into the case 10 through a bottom opening 10a thereof to mount the pivot member 31 in the case 10 together with a lower seat member 11. Then, a retaining member 12 is pushed in the bottom opening 10a so that its edge portion is securely engaged with a groove formed in an inside surface of the opening 10a as shown in the drawing. When pushed in the bottom opening 10a, the retaining member 12 is somewhat deformed toward inside, and once the edge portion thereof is engaged with the groove of the opening 10a, the retaining member 12 is securely fastened to the opening 10a. In this configuration, if an excessive force is applied to the shift lever 1 and hence to the retaining member 12 for instance when an abrupt deceleration of the vehicle causes a driver or passenger to move forward and to hit against the shift lever 1, the edge portion of the retaining member 12 breaks so that the retaining member 12 drops off from the opening 10a of the case 10 and the shift lever 1 is detached from the base 2 and retracted into the instrument panel IP.

This shift lever assembly may be equipped with an interlock mechanism, such as for preventing a particular range selecting operation or reverse-gear selecting operation of the shift lever under certain conditions, and/or may be equipped with a detent mechanism for giving a detent feel to the driver when operating the shift lever. However, because these optional functions are not directly related to the principle of the present invention, further description thereof is omitted.

Figure 2:
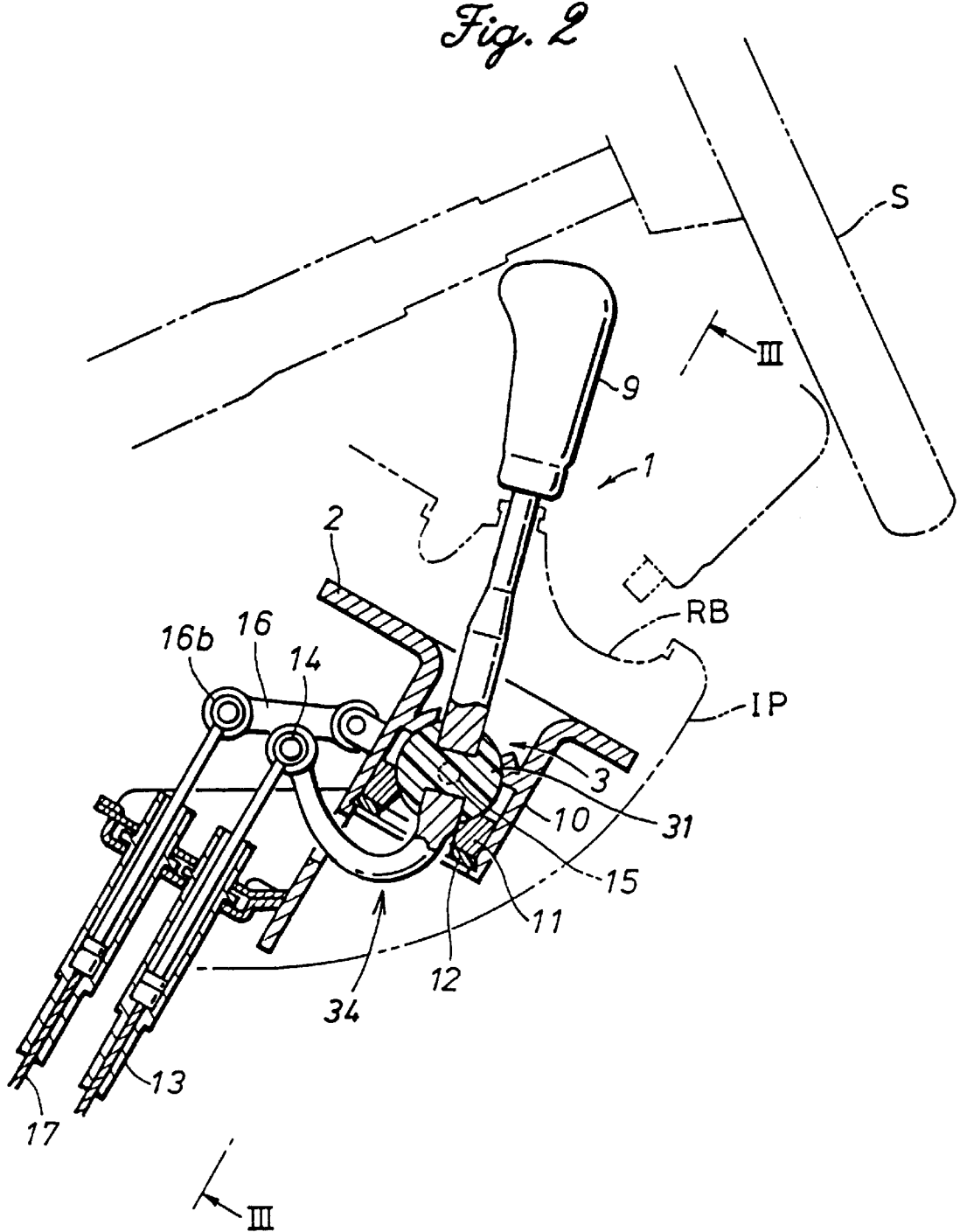
FIG. 2 is a side cross sectional view of a shift lever assembly according to the present invention adapted for use with a manual transmission.

FIGS. 2 to 4 illustrate another embodiment of the shift lever assembly according to the present invention. This embodiment is adapted for use with a manual transmission. In this embodiment, the angle of the hook-like bend of the shift lever 1 is more acute than in the first embodiment, so that the end 14 connected to the cable 13 for transmitting the shifting movements is brought closer to the gimbal joint 3 in order to provide a room for accommodating another cable 17 for transmitting the selection movements of the shift lever 1 to the transmission. However, the end 14 also lies on the selection axis of the shift lever 1 in the same fashion as in the first embodiment. The second cable 17 is attached to one end 16b of a lever member 16 for transmitting the selection movements of the shift lever 1. The other end 16a (FIG. 3) of the lever member 16 is connected in the ball-and-socket joint manner to a spherical part formed at the free end of an arm 15 extending substantially laterally from the annular part 33 of the shift lever 1 and through an opening provided in a lateral side of the pivot member 31 (shown in FIGS. 3 and 4). A middle portion of the lever member 16 is connected to the base 2 so as to be pivotable around a pivot axis parallel to the shifting axis (best shown in FIG. 4) so that the lever member 16 operates in a seesaw-like fashion.

In this configuration, when the shift lever 1 is moved in the forward direction, the first cable 13 is pushed downward, and when the shift lever 1 is moved in the rearward direction, the first cable 13 is pulled upward, to thereby transmit the for-and-aft (or shifting) movements of the shift lever 1 to the transmission. When the shift lever 1 is moved to the left, the spherical part of the arm 15 is moved upward to push down the second cable 17, and when the lever 1 is moved to the right, the spherical part of the arm 15 is moved downward to pull up the second cable 17, to thereby transmit these lateral (selecting) movements of the lever 1 to the transmission. In this configuration, the shifting movements of the shift lever 1 do not substantially move the second cable 17 longitudinally, and the selection movements of the shift lever 1 do not substantially move the first cable 13 transversely, and further, only the pushing and pulling forces are applied to the cables 13 and 17 as in the first embodiment.

In the manual transmission, because the shift pattern is determined by the transmission mechanism itself, the guide plate 7 and the outer surface 8 used in the first embodiment can be omitted. Instead, in the second embodiment, the upper opening formed in the instrument panel IP for accommodating the shift lever 1 is covered by a suitable protective cover such as a rubber boot RB. The base 2 with two holes in its bottom for the cables 13 and 17 in the second embodiment can also be used without any significant modification in the first embodiment in which the base 2 is required to have only one hole for the cable 3 because the unused hole does not adversely affect the shift lever assembly either functionally or aesthetically. Additionally, because the shift control of the manually shiftable automatic transmission can be provided by the guide plate 7 as shown in the first embodiment without using an additional interlock mechanism, the shift lever 1 does not have to be equipped with an additional mechanism such as a push button for releasing the interlock mechanism. Therefore, the shift lever 1 can be commonly used in the first and second embodiments. Further, although the present invention can be practiced with a ball joint instead of a gimbal joint such as shown in the embodiments, when a gimbal joint is used for pivotably supporting the shift lever, there is an advantage that the rotation of the shift lever around its longitudinal axis can be prevented even in the case of an automatic transmission where only a cable for transmitting the shifting movements of the shift lever is used and there is no lever member 16 or the like which can function to prevent the rotation of the shift lever around its longitudinal axis in the case of a manual transmission. Thus, most of the components of the shift lever assemblies shown in the first and second embodiments for use with an automatic transmission and for use with a manual transmission, respectively, can be commonly used.

As described above, in a shift lever assembly according to the present invention, the selection movements of the shift lever do not cause the bending of the cable connected to the extension of the shift lever for transmitting the shifting movements of the shift lever, and do not apply undesired stress upon the cable. Therefore, with a simple mechanism, it is possible to put the connection between the extension of the shift lever and the cable close to the end of the cable casing for receiving and guiding the cable, thus achieving reduced assembly size and smaller space for installing the shift lever assembly.

Although the present invention has been described in terms of specific embodiments thereof, it is possible to modify and alter details thereof without departing from the spirit of the present invention. For example, the extension of the shift lever 1 may extend from a part of the shift lever 1 above the gimbal joint 3 as long as the connection between the extension and the cable lies on the selection axis. Further, the retaining member 12 may be fastened in the opening 10*a* of the case 10 by various means other than shown in the embodiments. For example, the retaining member 12 can be fastened by screws or adhesive or by being pressingly engaged with the opening 10*a* so that when an excessive force is applied to the retaining member 12, the retaining member 12 breaks or dislodges from the opening 10*a* to allow the shift lever 1 to be detached from the base 2 and retracted into the instrument panel IP.

What we claim is:

1. A shift lever assembly for a vehicle, comprising:

a base member;

a gimbal joint mounted on said base member;

a shift lever pivotably supported by said gimbal joint so as to be pivotable around a shifting axis and a selection axis, the shifting axis and the selection axis being at a right angle to each other; and an extension extending from the shift lever and connected to a first cable for transmitting a movement of the shift lever around the shifting axis to transmission means, wherein the connection between the first cable and the extension of the shift lever lies on the selection axis, and wherein the shift lever has a free end provided with a knob to be handled by a vehicle operator and a base end pivotably supported by the gimbal joint, and the extension extends from the base end of the shift lever in the direction away from the free end of the shift lever and is curved in a hook-like manner so that the connection between the first cable and the extension lies on the selection axis.

2. A shift lever assembly according to claim 1, further comprising means for transmitting a movement of the shift lever around the selection axis to the transmission means.

3. A shift lever assembly for a vehicle, comprising:

a base member;

a pivot member mounted on said base member;

a shift lever supported by pivot member so as to be pivotable around a shifting axis and a selection axis, the shifting axis and the selection axis being at a right angle to each other; and an extension extending from the shift lever and connected to a first cable for transmitting a movement of the shift lever around the shifting axis to transmission means, wherein the connection between the first cable and the extension of the shift lever lies on the selection axis, and wherein the shift lever has a free end provided with a knob to be handled by a vehicle operator and a base end supported by the pivot member so as to pivotable around the selection axis, and the extension extends from the base end of the shift lever in the direction away from the free end of the shift lever and is curved in a hook-like manner so that the connection between the first cable and the extension lies on the selection axis.

4. A shift lever assembly according to claim 3, wherein the pivot member is generally cylindrical in shape and the base member comprises a case adapted for mounting the pivot member so that the pivot member is pivotable around the shifting axis.

5. A shift lever assembly according to claim 4, wherein the shift lever is supported so as to be pivotable around the selection axis by the pivot member via a pivot pin.

6. A shift lever assembly according to claim 4, wherein the pivot member includes a pivot pin aligned with the selection axis, and the shift lever has an annular part fitted on the pivot pin of the pivot member so that the shift lever is pivotable around the selection axis.

7. A shift lever assembly according to claim 6, further comprising means for transmitting a movement of the shift lever around the selection axis to the transmission means.

8. A shift lever assembly according to claim 7, wherein the means for transmitting a movement of the shift lever around the selection axis comprises:

an arm member extending from the annular part of the shift lever substantially laterally through an opening provided in the pivot member; and a lever member having one end pivotably connected to a free end of the arm member, the other end connected to a second cable operatively connected to the transmission means, and a middle portion pivotably connected to the base member.

9. A shift lever assembly according to claim 8, wherein the middle portion of the lever member is connected to the base member so as to be pivotable around an axis parallel to the shifting axis.

10. A shift lever assembly according to any one of the preceding claims, wherein the shifting axis extends substantially in a lateral direction of the vehicle and the selection axis extends substantially in a longitudinal direction of the vehicle.

* * * * *